United States Patent
Brazelton et al.

[11] Patent Number: 5,164,429
[45] Date of Patent: Nov. 17, 1992

[54] POLYMER ACTIVATION APPARATUS

[75] Inventors: Carl L. Brazelton, Kankakee; Troy C. Litherland, Bradley, both of Ill.; J. Derek Green, Wellington, England; Yong H. Kim, Flossmoor, Ill.

[73] Assignee: Stranco, Inc., Bradley, Ill.

[21] Appl. No.: 370,375

[22] Filed: Jun. 22, 1989

Related U.S. Application Data

[63] Continuation-in-part of Ser. No. 89,344, Aug. 25, 1987, abandoned.

[51] Int. Cl.$^5$ .......................... C08L 1/08; C08L 33/26
[52] U.S. Cl. .......................... 523/322; 523/313; 523/315; 523/318; 523/319; 523/323
[58] Field of Search ................ 523/313, 315, 318, 319, 523/322, 323

[56] References Cited

U.S. PATENT DOCUMENTS

| | | | |
|---|---|---|---|
| T 896,051 | 11/1970 | Hamlin et al. | 523/319 |
| 2,008,684 | 7/1935 | Craddock | 259/97 |
| 2,212,260 | 8/1940 | Brotham | 259/109 |
| 2,268,461 | 12/1941 | Nichols | 259/9 |
| 2,556,014 | 6/1951 | Tolman | 259/21 |
| 2,651,582 | 9/1953 | Courtney | 106/167 |
| 2,686,110 | 8/1954 | Carver | 23/285 |
| 2,740,696 | 4/1956 | Longwell | 23/252 |
| 3,252,689 | 5/1966 | Blomgren et al. | 259/8 |
| 3,319,937 | 5/1967 | Wilson et al. | 259/8 |
| 3,389,970 | 6/1968 | Scheibel | 23/270.5 |
| 3,536,646 | 10/1970 | Hatch et al. | 523/322 |
| 3,559,959 | 2/1971 | Davis | 259/66 |
| 3,742,735 | 7/1973 | Verreyne et al. | 259/7 |
| 3,747,899 | 7/1973 | Latinen et al. | 259/9 |
| 3,756,570 | 9/1973 | Buhner | 259/6 |
| 3,852,234 | 12/1974 | Venema | 260/29.6 H |
| 4,113,688 | 9/1978 | Pearson | 260/29.6 PM |
| 4,125,574 | 11/1978 | Kastner et al. | 260/884 |
| 4,217,145 | 8/1980 | Gaddis | 106/170 |
| 4,218,147 | 8/1980 | Rosenberger | 366/162 |
| 4,470,907 | 9/1984 | Sencza | 210/192 |
| 4,522,502 | 6/1985 | Brazelton | 366/100 |

Primary Examiner—Paul R. Michl
Assistant Examiner—Andrew E. C. Merriam
Attorney, Agent, or Firm—Welsh & Katz, Ltd.

[57] ABSTRACT

Polymer activation apparatus for activating a liquid polymer emulsion in dilution water includes a first processing zone in which the polymer solution is subjected to a high mean shear rate for a predetermined period of time, and a second processing zone in which the polymer solution is subjected to a low mean shear rate for a longer period of time. The shear rates and residence times in the zones are selected to produce maximum activation in less total processing and aging time than that required in known apparatus.

1 Claim, 8 Drawing Sheets

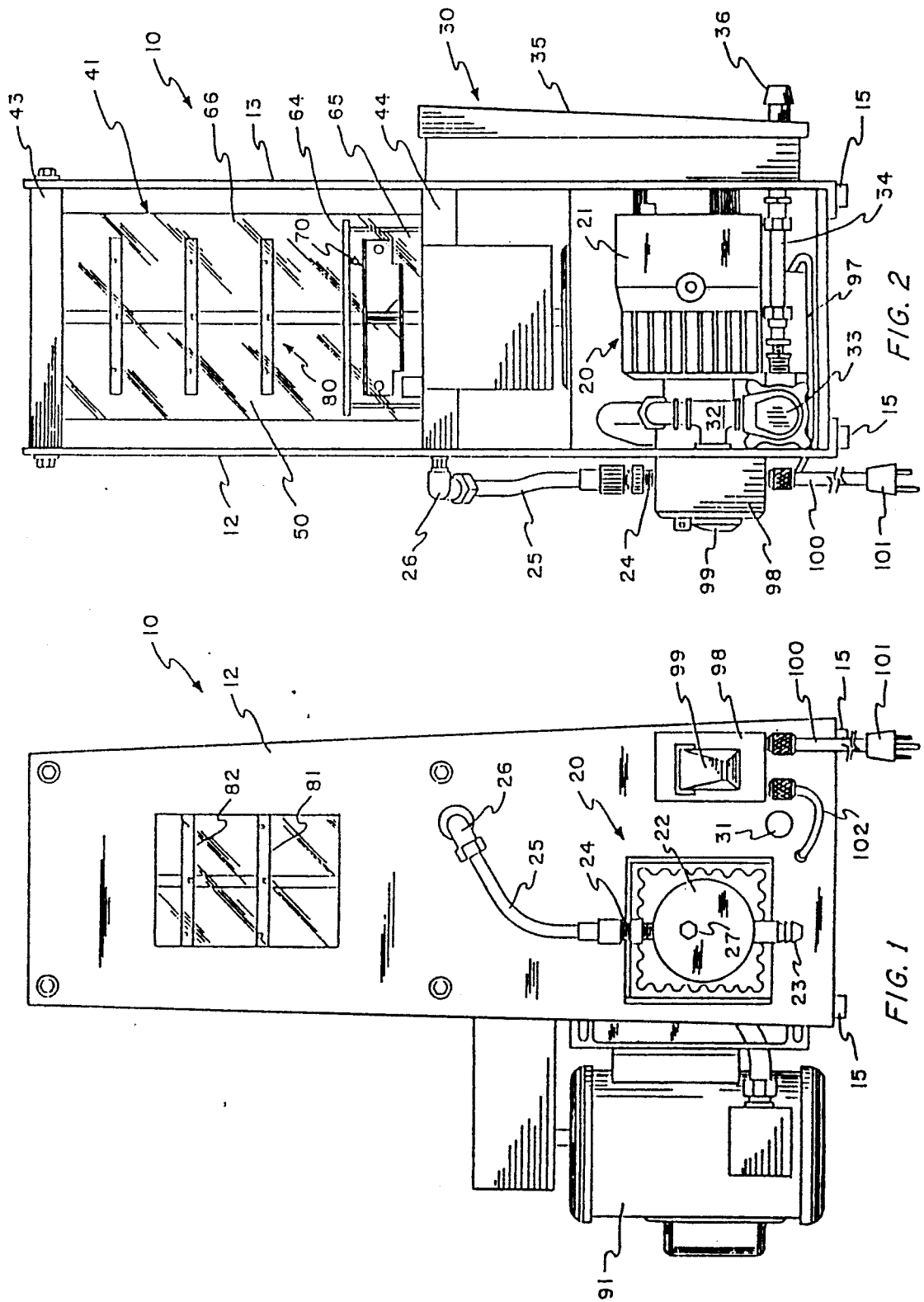

| POLYMER | VISCOSITY AFTER 5 MIN. AGING TIME (%) | | VISCOSITY AFTER 15 MIN. AGING TIME (%) | | MAXIMUM VISCOSITY |
|---|---|---|---|---|---|
| STOCKHAUSEN PRAESTOL N3100L | 140 | (95) | 148 | (100) | 148 |
| ALLIED COLLOID PERCAL 710 | 299 | (84) | 345 | (97) | 357 |
| ALLIED COLLOID PERCAL 767 | 99 | (76) | 116 | (89) | 130 |
| ALLIED CHEMICALS CLARIFLOCAZIOP | 130 | (90) | 138 | (96) | 144 |
| NALCO CHEMICAL 7775 | 167 | (77) | 186 | (86) | 216 |
| BUCKMAN LABORATORIES BL-540 | 118 | (83) | 129 | (91) | 142 |

FIG. 14

POLYMER ACTIVATION APPARATUS

This is a continuation-in-part of Ser. No. 89,344, filed Aug. 25, 1987, now abandoned.

BACKGROUND OF THE INVENTION

This invention relates to apparatus which mixes a polymeric flocculant in dilution water and activates the polymer for liquid/solid separation, as in water and waste-water treatment, and more particularly, to polymer activation and dilution apparatus which produces more rapid and complete activation of the polymer in less processing and aging time than known apparatus, without damaging the polymer structures excessively.

Flocculants and coagulants such as polyelectrolyte materials, polymers, gums and the like ("polymers") are high molecular-weight materials used, among other things, as an aid in removing fine particles from water, for dewatering sludges, and for other liquid/solid separation applications. The polymers are tightly tangled before activation, and extend or untangle completely when fully activated in dilution water. In practice, however, the polymers do not necessarily untangle completely or fully activate, which is undesirable.

The degree to which a polymer achieves coagulation and flocculation is improved with greater polymer activation. Polymer activation can perhaps best be measured by applying an activated polymer to a substrate such as sludge or the like, and measuring the rate of settling under laboratory conditions. The highest rate of settling is indicative of the best possible polymer performance, which is believed to occur when the polymer molecules are at or reasonably close to being fully untangled or activated.

Another indication of full or optimum polymer activation is viscosity. Generally, viscosity increases as the polymer becomes more fully activated. However, the degree of potential activation is related to the chemical composition of the polymer, the chemical properties of the dilution water in which the polymer is mixed, and the manner in which the polymer is mixed with the dilution water. As a result, a particular polymer may reach a different maximum viscosity in different water or under different mixing conditions. When maximum viscosity is reached, the viscosity will not decrease significantly for a relatively long time, unless a substantial number of polymer molecules have been damaged in the activation process. By activating several samples of a particular polymer under varying time and energy conditions, optimum activation can be determined by measuring and comparing the viscosity of the samples over time. Optimum activation conditions are considered to be those conditions which produce maximum viscosity with the least amount of processing time and aging time (after processing), without a significant decrease in viscosity after the maximum viscosity is reached.

The polymer/dilution water solution can be mixed under various energy and time conditions. An inadequate combination of energy and time can result in less than complete activation, and an excessive energy and time combination can damage the polymer molecules, which is undesirable. Thus, there is a need for polymer activation apparatus which mixes the polymer with dilution water under optimum energy and time conditions, to produce more complete polymer activation.

Accordingly, an object of this invention is to provide new and improved polymer activation methods and apparatus.

Another object is to provide new and improved polymer activation methods and apparatus for water treatment.

Still another object is to provide new and improved polymer activation apparatus which produces more rapid and complete activation of the polymer in diluted polymer solutions, without excessively damaging the polymer.

SUMMARY OF THE INVENTION

In keeping with one aspect of this invention, polymer activation apparatus is disclosed for mixing polymers in dilution water. A selected polymer is initially activated by mixing it with the water in a vessel and subjecting the solution to relatively high mean shear rates of between about 1,200/sec. and 9,000/sec. for between about 6 and 120 seconds. Mean shear rate in this context is related to the power dissipated by fluid motion (P), as measured in water, the dynamic viscosity of water ($\mu$) and the fluid volume in the mixing vessel (V) in a manner which will be described.

The diluted polymer solution is then subjected to one or more lower means shear rates between about 18% and 40% of the initial shear rate for between about 150% and 400% of the time the diluted solution is subjected to the first mean shear rate. The solution is then allowed to rest undisturbed, i.e., the solution is aged. With most polymers, the diluted polymer reaches at least about 75% of its maximum viscosity in less than about 5 minutes of aging time, and at least about 85% of its maximum viscosity in less than about 15 minutes of aging time, without excessively damaging the polymer structures.

The invention can be practiced by mixing the polymer in two or more separate and distinct zones, the first zone producing the relatively high mean shear rate, and the second zone producing the lower mean shear rate. In one embodiment, the high shear zone is a chamber which includes an impeller secured to a shaft. The lower shear zone is a second chamber having several disc members which subject the solution to the lower means shear rate when rotated at the same rate as the high shear impeller.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a rear elevational view of one embodiment of a multiple zone polymer activation apparatus incorporating the features of the present invention;

FIG. 2 is a left side elevational view of the apparatus of FIG. 1;

FIG. 14 is a chart showing the results of tests using different polymers with an embodiment of the invention.

DETAILED DESCRIPTION

Figure 4:
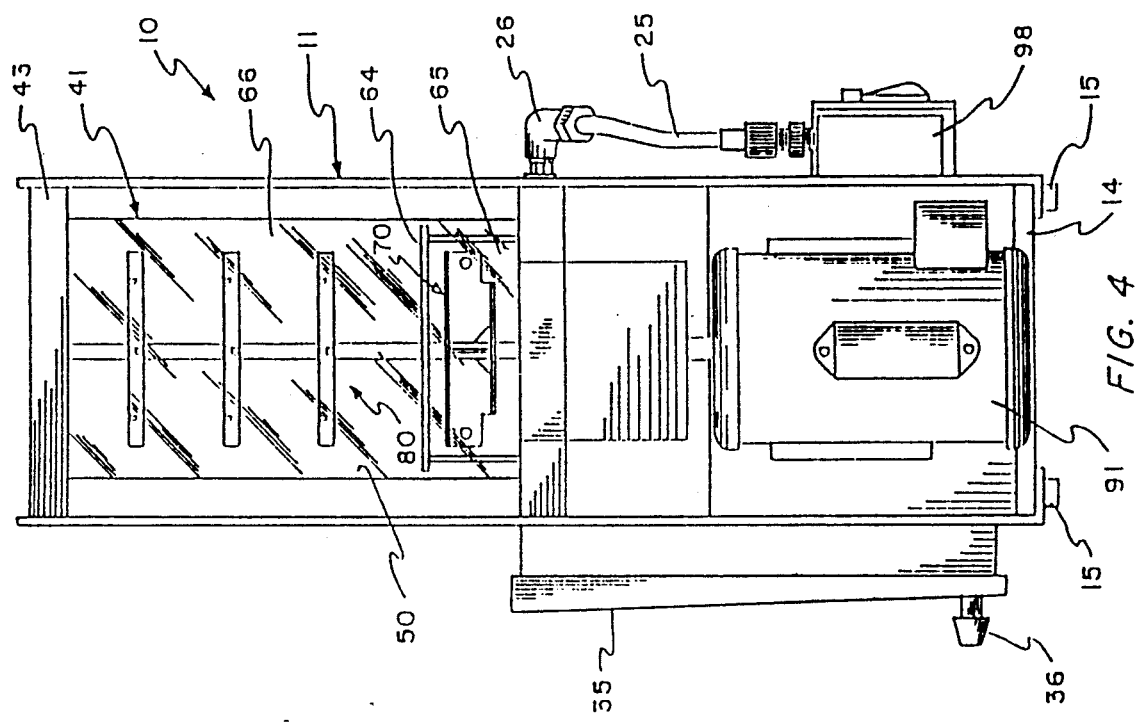
FIG. 4 is a right side elevational view of the apparatus of FIG. 1.
Figure 3:
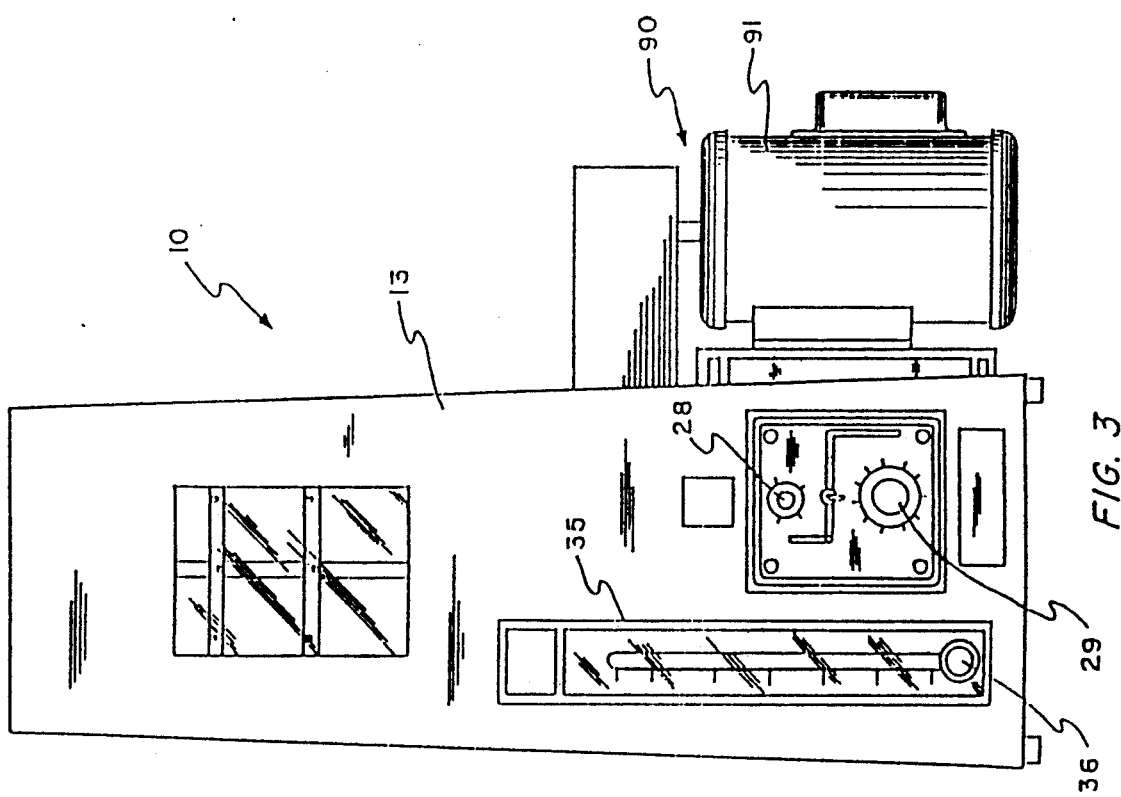
FIG. 3 is a front elevational view of the apparatus of FIG. 1.

Aqueous solutions of certain high molecular weight water soluble polymers are of considerable technical use as agents for wastewater treatment. The efficiency in the applications of the polymeric molecules, and therefore their economy of use, is a function of the conformation of the molecules in solution at the time of the application of these solutions to their respective substrates. Conformation includes such features as the dimensions of the molecules in their solvated state, their degree of entanglement, the extent of chain branching, their ionicity and the relative dispositions of polyion and counter ion.

The polymers are sold as concentrates in various physical forms such as finely ground powders, beads, concentrated solution gels, water in oil emulsions of gels, oil dispersions of powders, etc. They may be synthetic or natural materials. The synthetic materials are typified by the water soluble polymers of cationic acrylates or methacrylates, salts or acrylic acid, salts of 2 acrylamido 2 methyl propane sulfonic acid, acrylamide, etc. or copolymers involving such monomeric species, all of which at high molecular weight (i.e., above 100,000) have appreciable flocculating or thickening action which is a function of their conformation and bonding capability. Natural materials would be typified by water soluble polysaccharides and graft copolymers thereof with synthetic moieties, certain natural gums, polysaccharides of microbial origin, etc.

In the embodiments of the polymer activation apparatus described, a polymer or other flocculating agent, usually in the form of a gel, and dilution water are placed in a vessel to form a solution of between about 2% and 0.1% polymer, and more typically between 1.0% and 0.4% polymer. The diluted polymer solution is subjected to at least two mean shear rates for different periods of time. The solution is subjected to a high means hear rate for a relatively short contact time to initiate dissolution of the polymer gel and activation of the polymer molecules, and a lower mean shear rate for a longer period of time to further the dissolution and activation process and achieve at least about 75% of maximum viscosity within about 5 minutes after processing, and at least about 85% of the maximum viscosity within about 15 minutes after processing. This multiple shear rate processing arrangement optimize the dissolution of the gel and activation of the polymer molecules, without subjecting the molecules to excessive shearing conditions as might physically damage them.

Subjecting the polymer molecules to a high shear rate is beneficial and necessary during initial contact of the polymer with water. As the change in conformation of the polymer molecule takes place and dissolution begins, however, the polymer molecules become more fragile and more susceptible to physical damage, and the rate of application of energy should be lowered in response to that change.

The agitation of fluid in a mixing vessel may be characterized by the velocity gradient, or shear rate. However, the shear rate is not uniform within the vessel, so it is widely recognized that a mean velocity gradient or mean shear rate (G value) should be used, averaged through the fluid volume. The mean shear rate may be characterized for a Newtonian fluid such as water in accordance with equation (1) below:

$$G = \left( \frac{P}{\mu V} \right)^{\frac{1}{2}}, \tag{1}$$

where P is the power dissipated by the fluid motion, $\mu$ is the fluid dynamic viscosity, and V is the fluid volume in the mixing vessel.

If the fluid motion is created by a rotating impeller, P can be calculated using equation (2) below:

$$P = 2\pi NT,$$

where N is the rotational speed of the impeller and T is the measured torque. In that case, G can be calculated in accordance with equation (3), as follows:

$$G = \left( \frac{2\pi NT}{\mu V} \right)^{\frac{1}{2}} \tag{3}$$

Using equation (3), the dimension of G is in sec. $^{-1}$. As seen in equation (3), mean shear rate G may be determined experimentally by measuring actual power transmission to the fluid, that is, by measuring the rotational speed of the impeller, the torque of the impeller, the viscosity of the fluid and the fluid volume in the mixing vessel.

Polymer solutions are generally pseudoplastic fluids, which are not Newtonian, and do not have constant viscosity when subjected to changing shear rates. Consequently, it is preferable to measure the mean shear rate for particular apparatus using water, which has constant (dynamic) viscosity independent of the shear rate, or some other Newtonian fluid. For this reason, the parameters in which improved polymer activation is obtained using the multiple shear rate processes disclosed are measured in aqueous solution. Also, it should be understood that because polymers are pseudoplastic in their properties, comparative viscosity measurements should be made under the same conditions, i.e., with the same testing device rotating in the polymer solution at the same rate.

The precise mean shear rates and residence times required to obtain optimum activation for a specific polymer depend to some extent on the characteristics of the polymer and the dilution water. With some exceptions, such as polymers which are particularly difficult to activate or are particularly susceptible to damage, it is believed that about 85% of maximum activation of the polymer, as indicated by viscosity, can generally be obtained in about 15 minutes of aging time after processing, and about 75% of the maximum viscosity can be obtained in about 5 minutes of aging time. This result is obtained by subjecting the polymer/dilution water solution to (1) a first mean shear rate, as measured in water, of between 1,200/sec. and 9,000/sec. for between about 6 and 120 seconds, and (2) a second mean shear rate which is between about 18% and 40% of the first mean shear rate, for between about 150% and 400% of the amount of time the diluted polymer is subjected to the first mean shear rate.

While these two mean shear rates could be obtained in a vessel having a single chamber, it is preferable to provide two or more zones in a vessel for this purpose, each zone providing a different mean shear rate, as will be seen.

In accordance with one aspect of the invention, the multiple shear rate process is practiced through the use of a multi-zone mixing chamber with the first zone creating the high shear rate for a short residence time in the zone, followed by a low shear rate for a longer residence time. In this embodiment, the two zones are provided in a single housing with the first zone located adjacent yet distinct from the second zone.

As seen in FIGS. 1-5, polymer activation apparatus 10 is provided for use with a source (not shown) of concentrated polymer and a source of dilution water. The apparatus 10 draws polymer from the source and receives water from the supply, mixes and activates the polymer and provides a diluted activated polymer solution of the desired concentration. The concentration of polymer needed will depend on the polymer used, and can be determined through routine experimentation.

The polymer activation apparatus 10 has a frame 11 which is generally U-shaped in transverse cross section, as viewed in FIG. 4. The frame 11 includes a front panel 12 and a rear panel 13. The bottoms of the panels 12 and 13 are inturned and attached to a generally square base 14. A set of four feet 15 is attached to the inturned flanges of the panels 12 and 13.

The polymer activation apparatus 15 includes a polymer delivery mechanism 20, the basic element of which is a non-gear type pump 21. The pump 21 includes a totally enclosed pump drive with no exposed moving parts and is capable of moving highly viscous materials such as concentrated liquid polymer. The output of the pump is pulsating, and the pump 21 has an end or head 22 that is particularly adapted to pumping viscous polymer. The pump 21 may be adjustable to enable selection of the rate of flow of the polymer from 0.04 gallon per hour to 4.5 gallon per hour at a pressure of 50 psi.

The head 22 has an inlet fitting 23 for connection by way of tubing to a drum or tank (not shown) containing the undiluted or "neat" polymer. The head 22 also has an outlet fitting 24 which is connected to one end of tubing 25, the other end of which is connected to a fitting 26. A valved port 27 may be incorporated into the head 22 for priming purposes. The stroke frequency of the pump is adjusted by a control 28, and the stroke length is adjusted by a control 29. The frequency may be adjustable from 5 to 100 actuations per minute, each stroke pumping from 0.28-0.84 cc per stroke depending on stroke length. The control 29 can establish the stroke length at any point between 10% to 100% of its maximum.

The apparatus 10 also has a water delivery mechanism 30 which includes an inlet port 31 for connection to a supply of water. Fitting 32 connects the inlet port 31 to a solenoid valve 33 which is normally closed. As soon as power is supplied to the apparatus 10, the valve 33 is opened and water flows through tubing 34 into a flow meter 35. A control 36 can be provided to adjust the rate of water flow from perhaps 0.25 to 10 gallons per minute.

Figure 6:
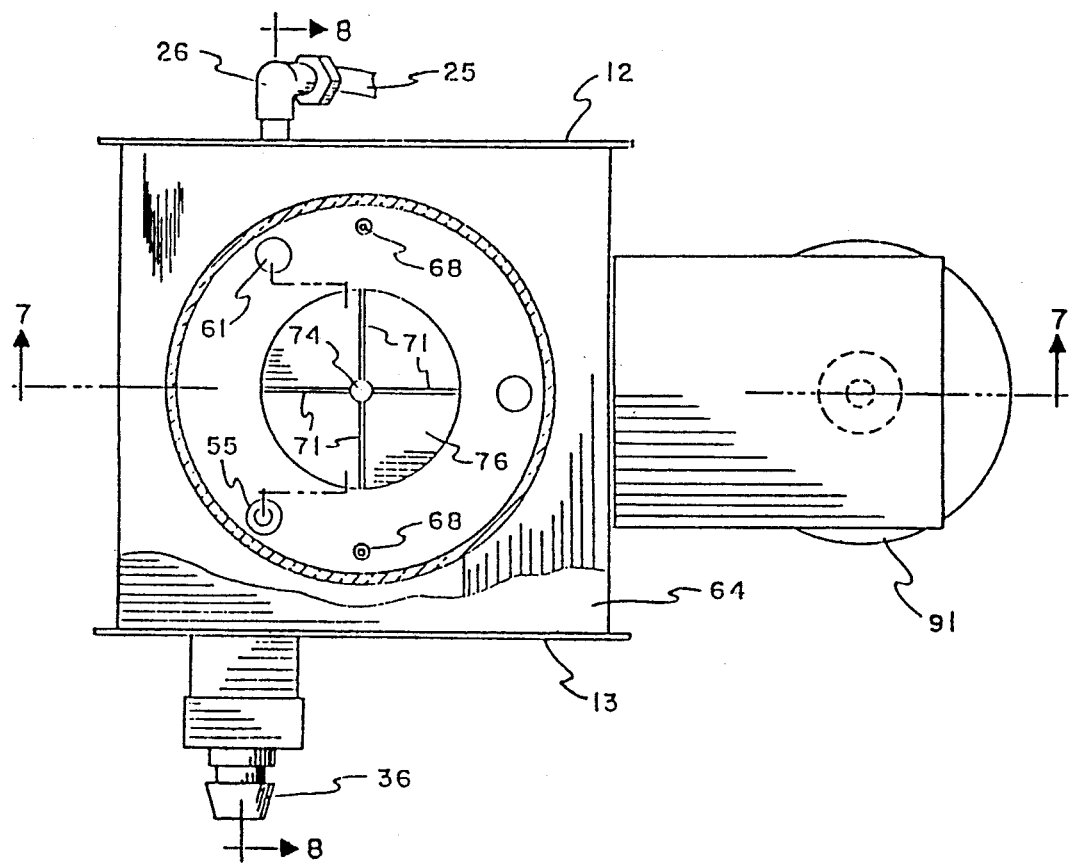
FIG. 6 is a view in horizontal section taken along lines 6—6 in FIG. 8.
Figure 7:
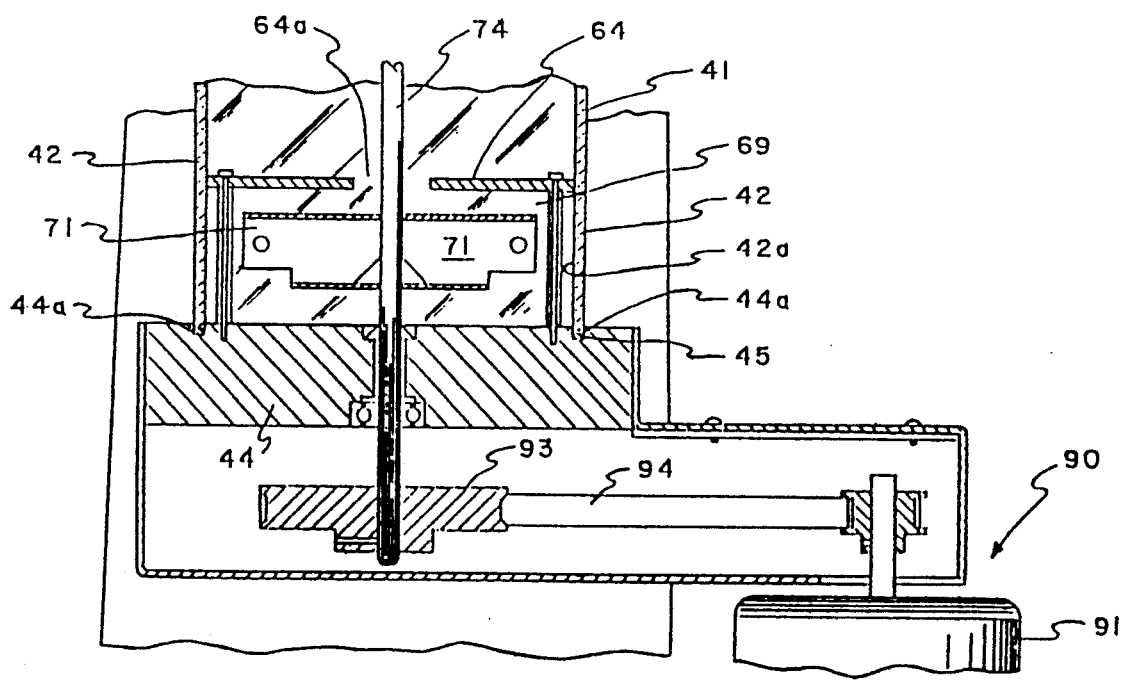
FIG. 7 is a view in vertical section taken along lines 7—7 in FIG. 6.
Figure 8:
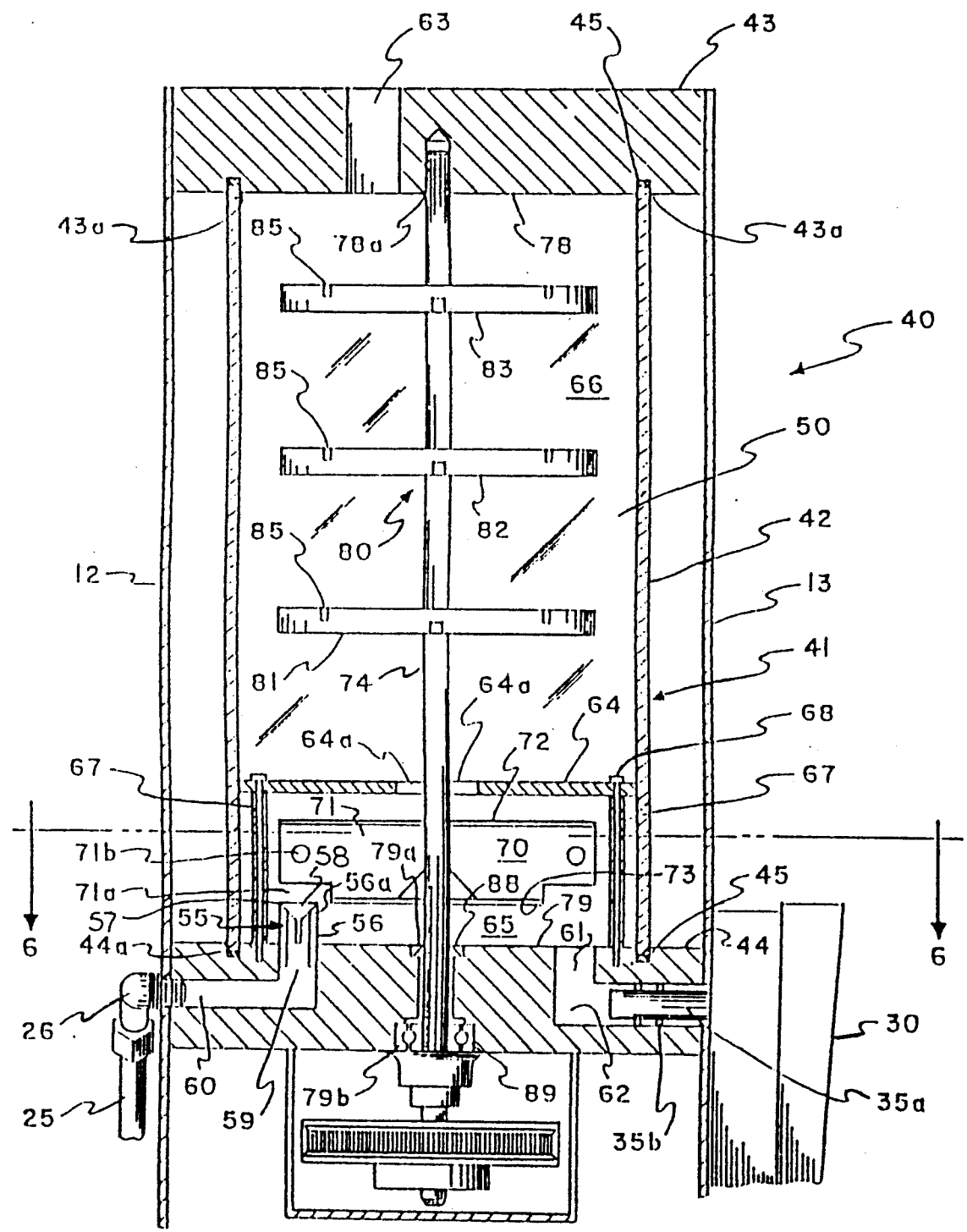
FIG. 8 is a view in vertical section taken along lines 8—8 in FIG. 6.

In addition, the apparatus 10 has a mixer 40, the details of which are best seen in FIGS. 6-8. The mixer 40 includes a cylindrical vessel 41 defined by a generally cylindrical barrel 42 and square top and bottom walls 43 and 44. The barrel 42 is preferably formed of clear acrylic so that the operator can observe the interior and thus know whether any malfunction is occurring. The bottom of the top wall 43 and the top of the bottom wall 44 have respective circular grooves 43a, 44a therein with a diameter equal to the diameter of the barrel 42 and respectively receiving O-rings 45 therein.

The ends of the barrel 42 are located in the grooves in contact with the O-rings 45. A suitable clamping means (not shown) is provided to clamp the barrel 42 between the top wall 43 and the bottom wall 44, to compress the O-rings 45 so as to define a liquid-tight chamber 50 inside the vessel 41.

Located within the chamber 50 is a check valve 55, which defines a polymer inlet for the vessel 41. The check valve includes a valve body 56 having one end 56a formed with a valve seat 57 which is engaged by a valve member 58. The other end of the valve body 56 fits within a vertically oriented bore 59 in the bottom wall 44. The bore 59 communicates with a polymer inlet bore 60, which is horizontally oriented. The outer end of the bore 60 is threaded and receives the fitting 26 on the end of the polymer pump outlet tubing 25. The check valve 56 enables the polymer to be admitted into the chamber 50, but precludes reverse flow of the liquid back into the polymer source when the pump is deenergized.

The bottom wall 44 defines a further vertical bore 61, defining a water inlet for the vessel 41, which communicates the lower end of the chamber 50 with a water inlet bore 62 which is horizontally oriented. The water inlet bore 62 receives an outlet tube 35a of the flow meter 35, and suitable fluid sealing means 35b is provided between the surface of tube 35a and the inner surface of the water inlet bore 62.

As seen in FIG. 6, the polymer inlet, defined by valve 55, and the water inlet, defined by bore 61, are located in the bottom wall 44 and aligned with one another, offset laterally relative to the diameter of the bottom wall 44. An impeller mechanism 70 is mounted for rotation in overlying relationship within water inlet 61 and polymer inlet 55, the impeller rotating clockwise as viewed in FIG. 5. This causes the water entering the vessel to sweep across the outlet of the polymer inlet check valve 55 on a short path after entry into the vessel. Thus, the water, which acts as the solvent, is at its maximum concentration when it attacks the polymer, also at its maximum concentration flowing out of inlet 55.

Referring to FIG. 8, the top wall 43 has an outlet bore 63 which extends vertically through the top wall 43 near the center therein, communicating with the upper end of the chamber 50. A drain bore (not shown) may be provided in the bottom wall 44 to facilitate draining of the vessel 41.

The inlet of the flow meter 35 is connected to the tubing 34 and the outlet is connected to the inlet bore 62. Thus, water flows through the flow meter 35, through the bore 62, to the bore 61, and then vertically upwardly exiting into the chamber 50. Concentrated polymer is moved by the pump through the bore 60 and into the bore 59 where it moves vertically through the check valve 55 and exits into the chamber 50. The polymer activation apparatus 10 is a continuous flow process apparatus with the pressure of the water moving the polymer through the vessel.

A baffle 64, which is a circular plate-like member, is mounted within the vessel 41 near the bottom wall 43, dividing the chamber 50 into a lower portion or zone 65 and an upper portion or zone 66. The outer diameter of the baffle corresponds to the inner diameter of the barrel, and the baffle has a central aperture 64a which provides the outlet for the lower zone 66 of the vessel, communicating a fluid flow path 69 at the top of the lower zone 66 with the upper zone 65. The baffle and its central aperture 64a which forms the outlet of the lower zone 66, causes retention of the polymer in the lower zone 66. Baffle 64 defines the uppermost part of the high shear zone, thereby confining that zone and determining in part the amount of turbulence created by the impeller 70.

The baffle 64 is supported above the upper surface of the bottom wall 43 by a pair of hollow spacer tubes 67 which are interposed between the baffle and the bottom wall and are held in place by long bolts 68 the shanks of which pass through the tubes 67 and have threaded ends received in tapped apertures in the upper surface of the bottom wall. Although the baffle 64 defines only two zones, further baffles may be provided to define additional mixing zones within the vessel 41, if desired.

In one embodiment of the vessel 41 which was constructed, the lower zone 65 occupied approximately twenty percent of the volume of the chamber 50 and the upper zone 66 comprised the remaining eighty percent of the volume of the chamber 50. However, other proportions for the zones may be used, such as one-third of the volume for the lower zone and two-thirds of the volume for the upper zone.

If the diluted polymer flows through the lower zone 65 and upper zone 66 at a substantially constant rate of flow, then the relative residence times in each zone is determined by the relative sizes of the zones. For example, to obtain a residence time in the upper zone 66 which is about 1.5 to 4 times the residence time of the diluted polymer in the lower zone 65, the volume of the upper zone should be about 1.5 to 4 times the volume of the lower zone when the flow rate is constant.

Figure 9:
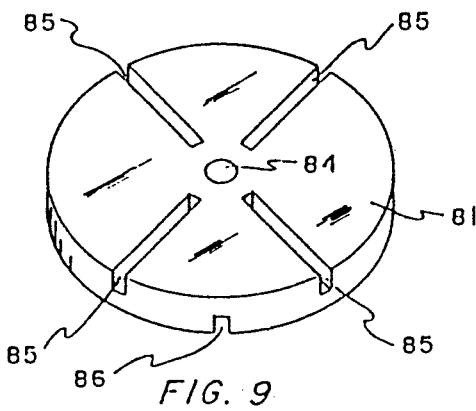
FIG. 9 is an isometric view of one of the impellers of the apparatus of FIG. 1.
Figure 5:
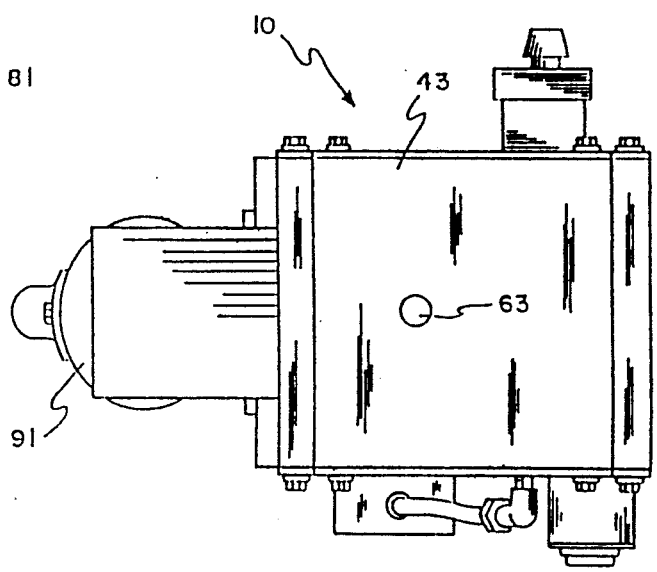
FIG. 5 is a top plan view of the apparatus of FIG. 1.
Figure 10:
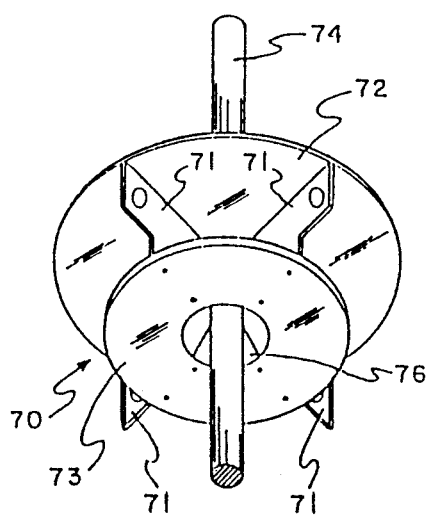
FIG. 10 is an isometric view from the bottom of another one of the impellers of the apparatus of FIG. 1.
Figure 11:
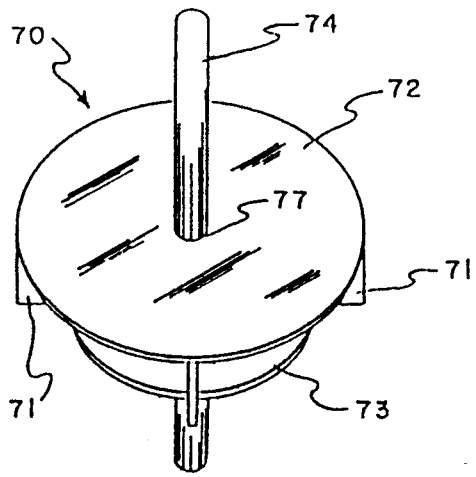
FIG. 11 is an isometric view from the top of the impeller shown in FIG. 10.

Referring to FIGS. 8-10, the mixer 40 also includes an impeller mechanism 70 located in the lower zone 65 to mix liquids introduced into the chamber 50 and an agitator embodied as a further impeller mechanism 80, located in the upper zone 66. The impeller mechanism 70 includes four fins 71, a top plate 72 and a bottom plate 73, the fins extending outward radially from the shaft 74, each being at right angles with respect to adjacent fins and being sandwiched between the top and bottom plates. In one embodiment of the apparatus 10, the fins 71 were about 2 inches wide and about 1 174 inches high.

The four fins 71 are secured by the upper and lower edges to the lower surface of plate 72 and upper surface of plate 73, respectively, in a suitable manner. The shaft 74 extends through the centers of the plates 72 and 73 and vertically within the chamber 50. The bottom plate 73 has a vertically extending aperture 76 therein through which passes the shaft 74, and the top plate 72 has an aperture 77 for receiving and securing the impeller mechanism 70 to the shaft 74. The diameter of aperture 76 in the bottom plate is substantially greater than the diameter of the shaft 74, defining a circular passageway at the bottom center of the bottom plate 73.

Each fin has a rectangular notch 71a in its lower outer edge and an aperture 71b thereabove. As shown in FIG. 8, the notch 71a affords clearance for the lower edge of the vane relative to the vertically projecting check valve 56. In addition, the notch 71a and the aperture 71b enhance movement of the fins through the polymer, adding to the turbulence generated by the impeller as it rotates. The impeller is large relative to the lower processing zone 65 and as shown in FIG. 8, the vertically oriented fins 71 extend approximately half the vertical height of the zone 65. The top plate 72 is attached to the shaft in a suitable manner and extends in a parallel spaced relation with the baffle plate 64, defining the fluid flow path 69. As the impeller 70 rotates, the polymer is moved outward towards the wall 42a of the vessel, and thus, the impeller moves the diluted polymer away from the outlet 64a, which is located above the center axis of the impeller. When the polymer reaches the outer edge of the impeller, the dispersed polymer moves upwardly into the flow path 69 is moved inwardly along the flow path 69 towards the aperture 64a for discharge into the upper zone 66. As has been indicated, the flow of the dispersed polymer is directed by the pressure of the water being supplied to the water inlet 61 of the lower zone 65.

The lower surface 78 of the top wall 43 includes a vertical slot 78a in which the upper end of the shaft 74 is received, and the upper surface 79 of the bottom wall 44 includes enlarged portions 79a and 79b, which receive, respectively, a mechanical seal 88 and a bearing 89 in which the lower end of the shaft is journalled. The impeller mechanism 70 is thus rotatably mounted in the vessel 41 about a vertical axis.

the impeller 80, which is located in the upper zone 66, includes three plate-like disc members 81-83, each having a central aperture 84 through which the shaft 74 is secured. The three disc members 81-83 are spaced apart from one another along the length of the shaft 74, with adjacent disc members 81, 82 and 82, 83 being spaced apart from one another by the same distance. When the shaft 74 is rotated, the disc members 81-83 move in open volume in the upper processing zone 66.

Each of the disc members, such as disc member 81, has a set of four radially extending grooves 85 in its upper surface, at right angles with respect to each other, and a further set of four radially extending grooves 86 in its lower surface, t right angles to each other, but offset 45° relative to the grooves 85 in the upper surface of the disc member 81. The grooves in the three disc members 81-83 increase the effective surface area of the disc members which contacts the mixture being processed in the upper zone 66.

The slot depth is selected as a function of the amount of energy to be imparted to the mixture for a given shaft speed. The deeper the grooves, the greater the amount of energy which is imparted to the mixture. Although the grooves are illustrated as extending to a depth corresponding to about half the thickness of the disc member, it is apparent that due to the offset spacing of the grooves on the upper and lower disc member surfaces, the grooves could be deeper than half the thickness of the disc member.

In one embodiment of the apparatus 10 constructed, the diameter of the disc members 81-83 was 4 inches, the thickness of the disc members was ½ inch and the depth of the grooves 85 and 86 was 174 inch by ¼ inch wide.

The polymer activation apparatus 10 further has a drive mechanism 90 for rotating the impeller shaft 74. Referring back to FIGS. 1-4, the drive mechanism 90 includes a motor 91 attached to the front panel 12 adjacent the upper end thereof. In an operative embodiment, the motor 91 developed ⅓ horsepower at 1,750 rpm. The motor 91 is geared down so that the impeller mechanism 70 operates at about 300 to 1,000 rpm. The rotating shaft of the motor 91 carries a toothed pulley 92 aligned with a toothed pulley 93 on the shaft 74 of the impeller mechanism 70. A toothed belt 94 engages the pulleys 92 and 93 so that operation of the motor 91 causes the shaft 74 to rotate. Because the two impellers 70 and 80 are carried by the shaft 74, they are rotated at the same speed. Power for the motor 91 is derived by wires in a conduit 97 connected to a switch box 98 having a switch 99. Cord 100 supplies power to the switch box 98 by way of a plug 101 which is inserted into an electrical receptacle such as a wall outlet. A cord 102 supplies electrical power to the switch box 98. Tubing (not shown) connects the outlet fitting 23 (FIG. 1) to the site at which the diluted polymer will be utilized. For example, it is contemplated that the drum of concentrated polymer and the polymer activation apparatus 10 will be located next to equipment which will deliver the diluted polymer into water to be treated.

In operation, with reference to FIGS. 1-4 and 8, the polymer activation apparatus 10 is placed near a drum of concentrated polymer, which may be highly viscous. Tubing connected to the fitting 23 is inserted into the polymer. A source of water is connected to the inlet 31. When power is applied, the solenoid valve 33 is automatically opened and water is delivered to the flow meter 35, irrespective of the condition of the switch 99. Accordingly, water immediately flows through the flow meter 35 and into the chamber 50, filling the same and exiting through the outlet bore 63 into the water treatment equipment (not shown).

When the switch 99 is operated to the "on" position, the pump 21 becomes energized and withdraws the concentrated polymer from the drum and moves it through the tubing 25 and the bore 60 and through the valve 55 into the chamber 50. The desired concentration of the resultant product is determined by selecting the flow rates of the polymer and the water. In the case of the polymer, the controls 28 and 29 are adjusted and in the case of the water, the control 36 is adjusted. When the switch 99 is operated to the "on" position, this also energizes the motor 91, which rotates the impeller shaft 74 to drive the impeller 70 and the disc member 80. The polymer activation apparatus provides a continuous flow process, with the mixture moving through the vessel under the force of the water supplied under pressure to the water inlet of the vessel. In the lower zone 65 of the mixing chamber, the high-speed multi-blade paddle wheel impeller 70 subjects the diluted polymer solution to a high mean shear rate for a short contact time. The high shear rate created by the impeller 70 drives the water into the polymer molecules while the molecules are not fragile, initiating activation and solvation. In the lower zone 65, water is the attacking medium. This provides more uniform wetting of the polymer so as to avoid damaging the molecule and decreasing the effectiveness of the polymer.

The shaft 74 rotates the impeller mechanisms 70 and 80 clockwise (as viewed in FIG. 6), the polymer initially being directed down and beneath the impeller mechanism 70, upward through the central aperture 76 in the bottom plate 73, and into the space between the top plate 72 and the bottom plate 73. As the impeller mechanism 70 rotates, the polymer is moved outwardly radially away from the center of the impeller mechanism to the edge of the impeller mechanism and is then moved upwardly into flow path 69 and along the flow path 69 to the outlet aperture 64a under the force of the water being supplied to the lower zone 65.

The polymer moves upwardly through the opening in the baffle 64 and into the upper zone 66 of the mixing chamber where the three slotted disc members are rotating on a shaft 74. The disc member 80 is a low energy device which imparts a lower shear rate to the mixture. The slots 84 and 85 in the disc members facilitate further mixing of polymer and water and move the polymer radially outward towards the side of the vessel. In the upper zone 66, dilute polymer is the attacking or solvating medium. The flat disc members move in open volume through the polymer and drag the polymer across the surfaces of the disc members and radially outward through the grooves. This results in lower shear rate mixing with flow through the upper processing zone 66 being characterized as laminar to mildly turbulent. The disc impeller 80 continues the dissolution and activation process in the upper mixing zone 66. The force of the water supplied to the inlet zone 65 causes the diluted polymer in the zone 66 to exit the mixing chamber 50 through the outlet bore 63, centrally located at the top thereof, and is supplied to water treatment equipment (not shown).

Of importance is the time that the water and polymer is retained in the two processing zones in the vessel 41. If the retention time in the lower zone 65 is too long, the polymer will have been exposed to the high shear created by the impeller mechanism 70 for an excessive period. This could cause the polymer to break and lose effectiveness. If the retention time in the upper zone 66 is too short, the polymer would not have an opportunity to be sufficiently activated to become effective. It has been determined that the preferred range of retention or residence time in the entire chamber 50 is between 30 seconds and 7 minutes. In an operative embodiment, the volume of the vessel 41 was such as to be capable of holding 2.7 gallons of liquid. The rate of flow of the water was adjustable between 0.25 and 10 gallons per minute. At the 6 gallon per minute rate, the retention time in the lower zone 65 and upper zone 66 was about 6 seconds and 24 seconds, respectively. At the 0.5 gallon per minute rate, the retention time in the lower zone 65 was about 1.1 minutes and upper zone 66 about 4.3 minutes.

Figure 12:
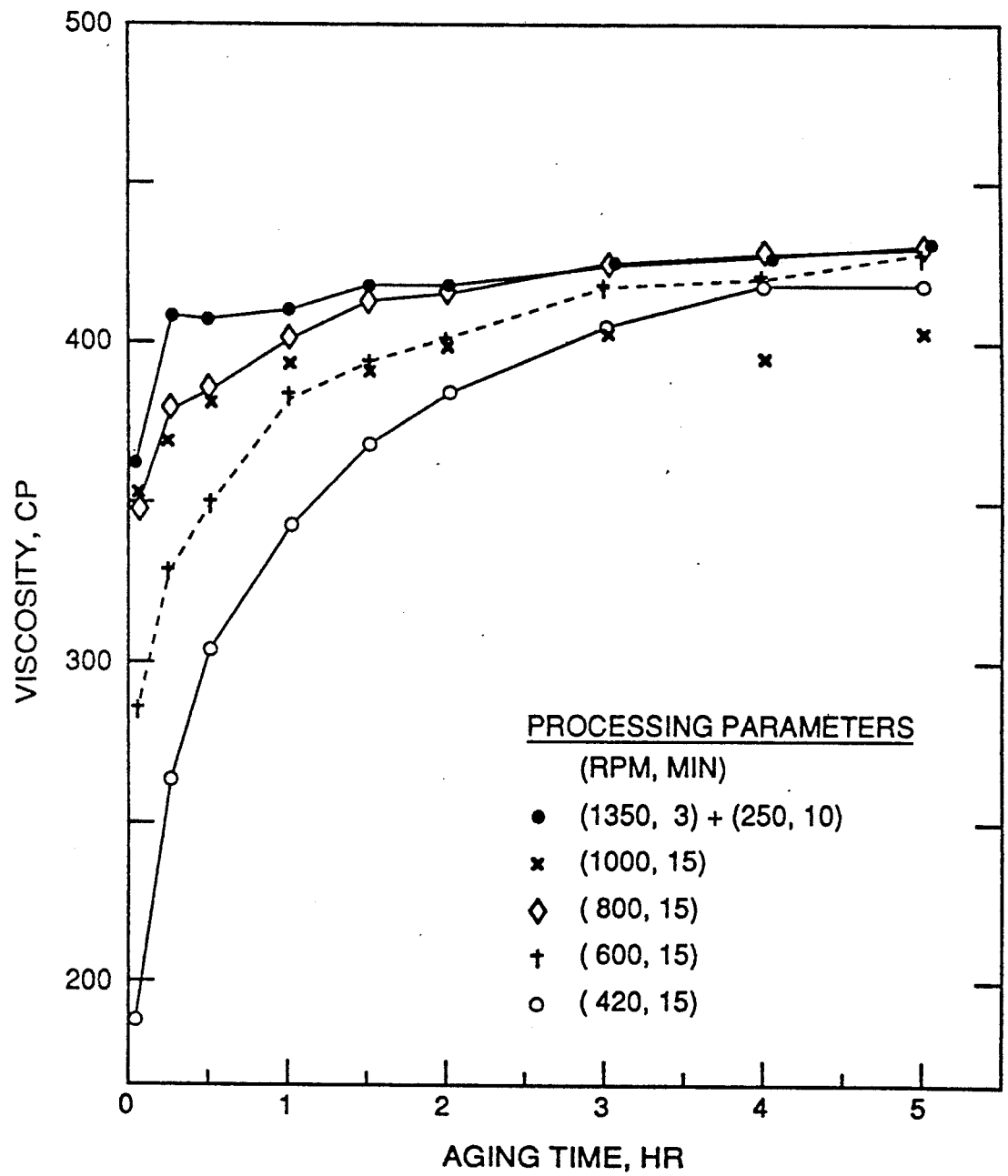
FIG. 12 is a chart showing the results of tests which illustrate the principles of the invention.

The improved results which can be obtained using the disclosed multiple shear rate process and apparatus are shown in FIG. 12, in which several samples of a polymer such Stockhausen Praestol A3035L were mixed in water having a total hardness of 100 mg/l to achieve a concentration of 0.15%. Test beakers and a commercially available mixer were used, and the relative degree of polymer activation was determined by measuring viscosity.

After mixing under the conditions shown in FIG. 12, the viscosity of the polymer solutions was measured over time. When the polymer was mixed at 420 revolutions per minute (rpm) for 15 minutes, maximum viscosity of approximately 415 centipoise (cp) was reached in about 4-5 hours. When the impeller speed was increased to 600 rpm, maximum viscosity of about 425 cp was reached after about 3 hours, and when the impeller speed was further increased to 800 rpm, maximum viscosity of approximately 425 cp was reached after about 1.5 hours. When the impeller speed was increased to 1,000 rpm, about 390 cp viscosity was reached in about 45 minutes, but the maximum viscosity of about 400 cp was significantly lower than the maximum viscosity reached under the previous conditions, and the viscosity decreased somewhat over the following several hours, indicating excessive damage to the polymer structures.

When the impeller speed was 1350 rpm for about 3 minutes, followed by 250 rpm for 10 minutes, viscosity of about 415 cp was reached in only about 15 minutes of aging time. The maximum viscosity of about 425 cp was comparable to the maximum viscosity under milder conditions, and it did not decrease significantly over the following several hours. This shows that subjecting the diluted polymer to a relatively high shear rate for one time period, and subjecting the diluted polymer to a lower shear rate for a greater time period produced higher viscosity in less total processing time and less aging time, without excessive damage to the polymer molecules.

Figure 13:
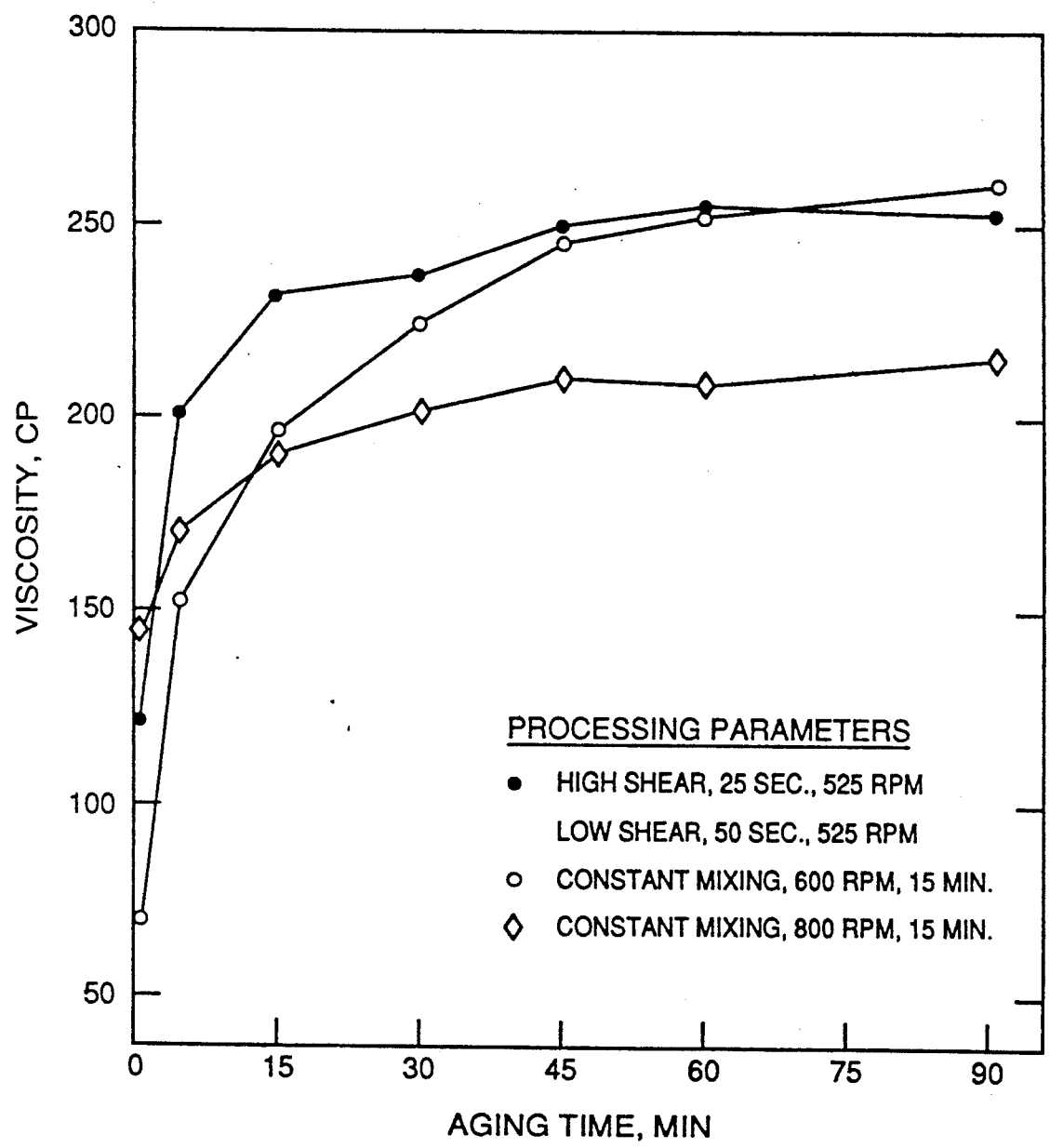
FIG. 13 is a chart comparing the results of tests made with an embodiment of the invention with tests made using single stage batch mixing.

FIG. 13 illustrates the improvement in polymer activation which can be achieved with this invention. An experiment was conducted using several samples of 0.15% Stockhausen Praestol A3035L polymer solution at 21 C., mixed with tap water having a total hardness of 170 mg/l. Batch mixing at 600 rpm for 15 minutes only produced initial viscosity of about 70 cp, and about 90% of maximum viscosity of about 260 cp was reached after about 30 minutes. When the speed of the impeller was increased to 800 rpm in batch mixing, the maximum viscosity was decreased significantly, to about 200 cp. However, using an embodiment of the present invention at only 525 rpm for about 75 seconds, at the mean shear rate shown in FIG. 13, initial viscosity after processing was about 125 cp, and about 90% of maximum viscosity was reached in less than about 15 minutes of aging time. In addition, almost 80% of maximum viscosity was reached after only 5 minutes of aging time.

This data indicates that increasing the mixing speed to 800 rpm caused significant damage to the polymer structures in the diluted polymer. It also shows that the present invention significantly reduces both the processing time and the aging time required to produce optimum activation of the polymer, without excessively damaging the polymer molecules.

The results which can be obtained using this invention can also be seen in FIG. 14, which is a chart showing actual results obtained using various commercially available polymers in an embodiment of the invention. The apparatus was operated at about 530 rpm, with a mean shear rate of about 4,000/sec. in the high shear zone, and about 1,300/sec. in the low shear zone. The residence time in the high shear zone was about 25 sec. and the residence time in the low shear zone was about 50 sec.

The polymers used in the experiments of FIG. 14 are identified by their commercial designations in the first column, and the measured viscosity after 5 minutes of aging time and 15 minutes of aging time is shown in the second and third columns, respectively, with the maximum viscosity shown in the fourth column. Viscosity was measured with a Brookfield RVT viscometer, rotating at 100 rpm. The percentages of the maximum viscosity reached after 5 and 15 minutes are shown in parentheses in the second and third columns, respectively.

It is apparent in FIG. 14 that for the polymers shown, over 75% of maximum viscosity was reached in about 5 minutes of aging time, and over 85%, and sometimes 100%, of maximum viscosity was reached in about 15 of aging time. Thus, this data further shows the advantages obtained using this invention.

A static mixer (not shown) may be interposed between the outlet 63 and the process to which the activated polymer is applied. In a static mixer, gentle mixing conditions prevail and the degree of dissolution or activation, that is to say the reduction of entangled polymer chains or coils and the general conformation characteristics of the polymer, are brought to an optimum with respect to the intended application. This step may be assisted by additional ingress of water such that the polymer need not be diluted further prior to its application and in general, the exiting polymer solution strength will generally be in the range 0.1% to 2% and most preferably within the range 0.1% to 0.4%.

It will be appreciated that while the foregoing description of the polymer activation apparatus includes specific details as to elements such as motors, pumps, etc. and operating parameters such as flow rates, shaft speed, etc. and that such details are for the purpose of illustrating the apparatus and are not intended as a limitation of the scope of the invention.

We claim:

1. A method of activating and diluting a polymer emulsion in water comprising the steps of:

placing the polymer emulsion and water in a first mixing zone of a mixing vessel to form a diluted polymer solution;

agitating said solution to create a first means shear rate in water of between about 1,200/sec. and 9,000/sec. for between about 6 and 120 seconds, said mean shear rate (G) being related to the power dissipated by the fluid motion (P), as measured in water, the dynamic viscosity of water ($\mu$) and the fluid volume in the mixing vessel (V) in the following manner:

$$G = \left(\frac{P}{\mu V}\right)^{\frac{1}{2}}$$

said first means shear rate being applied by first impeller means in said first zone, said power dissipated by the fluid motion (P), as measured in water, being related to the rotational speed of said impeller (N) and the measured torque of said impeller (T) as follows:

$$P = 2\pi NT,$$

said mean shear rate being:

$$G = \left( \frac{2\pi NT}{\mu V} \right)^{\frac{1}{2}}$$

transferring said solution from said first mixing zone to a second mixing zone, isolating said first and second mixing zones with baffle means; and agitating said solution to create at least one additional mean shear rate of between about 18% and 40% of said first mean shear rate for between about 150% and 400% of the time said solution is subjected to said first mean shear rate, said additional means shear rate being applied by second impeller means in said second zone;

said solution reaching substantially its maximum viscosity in less than about 15 minutes of aging time, without excessively damaging the polymer structures in said solution.

* * * * *

UNITED STATES PATENT AND TRADEMARK OFFICE
CERTIFICATE OF CORRECTION

PATENT NO. : 5,164,429

DATED : 11/17/92

INVENTOR(S) : Carl L. Brazelton et al

It is certified that error appears in the above-identified patent and that said Letters Patent is hereby corrected as shown below:

| | |
|---|---|
| Col. 3, Line 58 | Change "means" to --mean-- |
| Col. 3, Line 58 | Change "hear" to --shear--. |
| Col. 3, Line 66 | Change "optimize" to --optimizes--. |
| Col. 7, Line 63 | Change "1 174" to --1-1/4--. |
| Col. 8, Line 55 | Change "t" to --at--. |
| Col. 9, Line 6 | Change "174" to --1/4-- |
| Col. 11, Line 45 | Change "rate" to --rates-- |
| Col. 12, Line 59 | Change "means" to --mean-- |

Signed and Sealed this

Thirtieth Day of November, 1993

BRUCE LEHMAN

Attest:

Attesting Officer

Commissioner of Patents and Trademarks